Aug. 27, 1957            J. R. HART            2,803,960
APPARATUS FOR TESTING SPECIFIC GRAVITY OF LIQUIDS
Filed Dec. 8, 1954
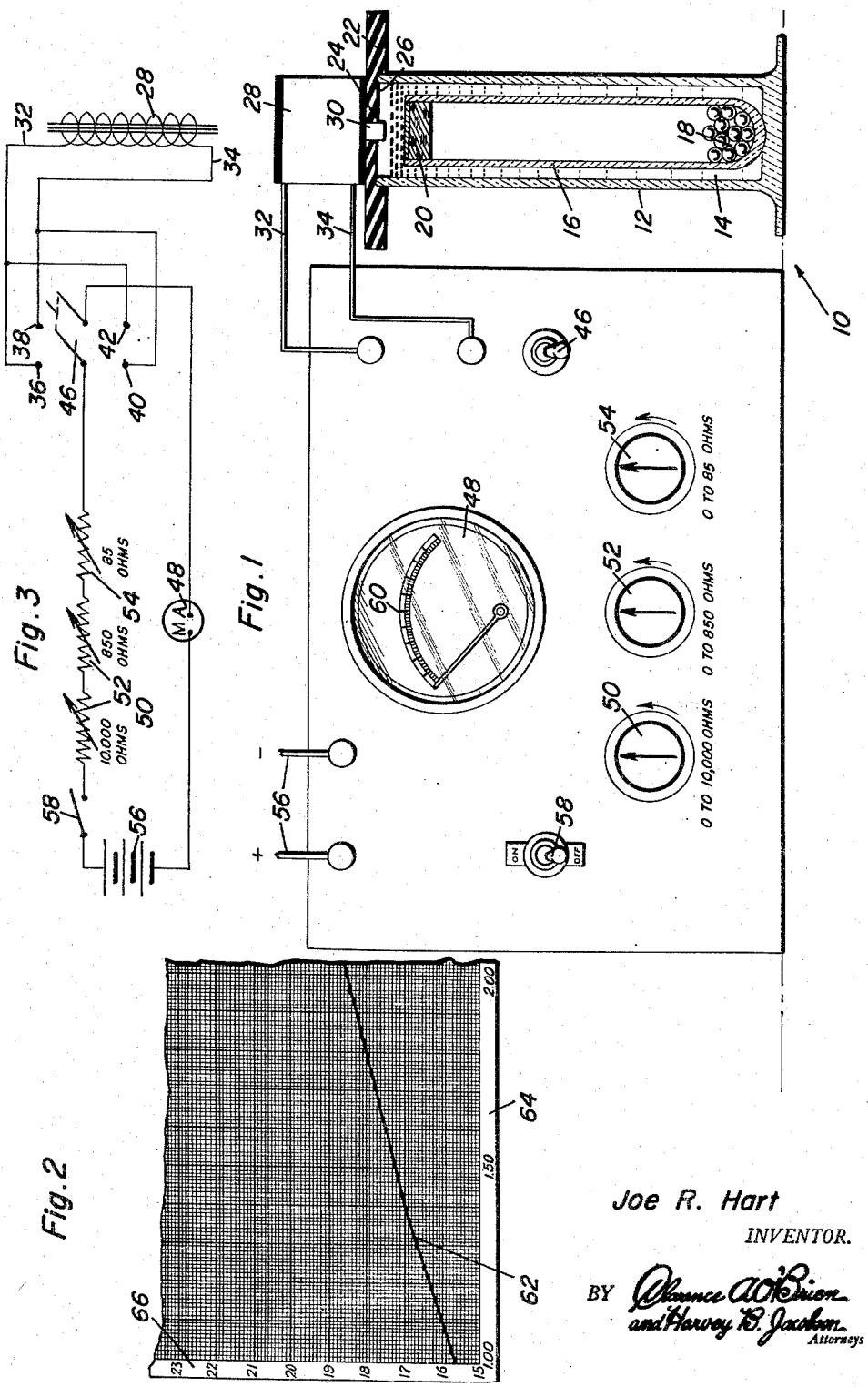
Joe R. Hart
INVENTOR.

United States Patent Office 2,803,960
Patented Aug. 27, 1957

2,803,960

APPARATUS FOR TESTING SPECIFIC GRAVITY OF LIQUIDS

Joe R. Hart, College Park, Md.

Application December 8, 1954, Serial No. 473,787

1 Claim. (Cl. 73—32)

This invention relates generally to an electrical testing apparatus, and more particularly to apparatus for the analysis of a mixture of two liquids.

If two liquids of different specific gravities are mixed together so as to form a solution, the percent of either one of the two liquids present is a function of the specific gravity of the solution. Therefore, if the specific gravity of the solution can be measured, it is possible to determine the percentage composition of the solution. It is therefore the primary object of the present invention to provide means of obtaining a value which bears a constant relationship to the specific gravity of the liquid in a simple, efficient and highly accurate manner while eliminating the necessity of using accurate balances and the like, thereby enabling the percentage composition of the liquids to be obtained.

The construction of this invention features means for applying a gradually increasing magnetic field in such manner as to enable the recording as to the amount of electrical energy necessary to cause a weighted bulb to rise. Means are also provided for enabling residual magnetism to be eliminated by reversing the polarity of the field and, in addition, the coil is supported on the container in a novel manner.

These, together with the various ancillary objects and features of the invention which will become apparent as the following description proceeds, are attained by this apparatus for analysis of mixtures, a preferred embodiment of the invention being shown in the accompanying drawings, by way of example only, wherein:

Figure 1 is a schematic illustration of the component elements of the invention with parts thereof being shown in section for greater clarity;

Figure 2 is a partial plan view of a graph from which empirical data has been plotted, the graph being utilized in conjunction with the invention for determining the specific gravity of a mixture; and Figure 3 is a wiring diagram of the electrical components of the invention.

With continuing reference to the accompanying drawings wherein like reference numerals designate similar parts throughout the various views, reference numeral 10 is used to generally designate the testing apparatus comprising the present invention. This testing apparatus contains a container, such as a hydrometer jar 12 containing a quantity of the solution to be tested, which is generally indicated at 14.

Positioned in the hydrometer jar 12 is a bulb 16 filled with shot, as at 18, or otherwise weighted, and provided with a soft iron disk 20 at the upper portion thereof which seals the tube 16. The disk 20 may be held in place with any suitable cement insoluble in the liquid 14. The shot or weights 18 serve to hold the bulb in a vertical position and prevent it from floating.

Positioned on the upper edge of the container 12 is a plate 22 preferably of insulative material and which has an aperture 24 therethrough. The plate 22 is recessed, as at 26, for centering the plate 22 on the container 12 and positioned on the plate 22 is a coil 28 having a soft iron core 30 engaged in the aperture 24 and extending partially therethrough so as to center the coil 28 with respect to the container 12 and with respect to the bulb 16.

Connected to the coil 28 are leads 32 and 34 which are, in turn, connected to terminals 36 and 38. Other terminals 40 and 42 are connected in parallel, respectively, with the terminals 38 and 36.

The terminals 36, 38, 40 and 42 are the terminals of a double-pole double-throw switch 46 which is utilized for reversing the polarity of the magnetic field formed by the coil 28 when the coil is excited. Connected across the switch 46 and across a milliammeter or other suitable indicator 48 as well as across rheostats 50, 52 and 54, is a source of electrical power 56 controlled by a conventional off-on switch 58. The rheostats 50, 52 and 54 are variable, the rheostat 50 varying from zero to 10,000 ohms, the rheostat 52 varying from zero to 850 ohms, while the rheostat 84 can be varied from zero to 85 ohms. In this manner, the amount of electrical energy flowing to the coil 28 can be varied and increased gradually. When the magnetic field induced by the increased current in the coil 28 is sufficient to cause the weight 20 to be attracted and thus make the bulb 16 rise, the value on the scale 60 of the indicator 48, such as the milliammeter or the like, can be read.

By making current measurements and plotting the value read off the scale 60 with respect to the known percentage composition of a known solution, a graph 62 can be plotted, the reading on the scale 60 being shown along the coordinate 64 of the graph while the percentage composition of one of the liquids in the solution being shown along the coordinate 66.

In use, if it were desired to find the specific amount of oil contained in a sample of soybeans, the following process would be followed. 100 grs. of soybeans or any other chosen amount may be placed in a conventional mill. After a pregrind of approximately one-half a minute, 100 milliliters of orthodichlorobenzene are added and grinding is then continued for four additional minutes. At the end of this time, the soybeans will have been ground to an extremely fine consistency, and it has been shown that the oil they contained will have been completely extracted and dissolved in the orthodichlorobenzene. The solution is then filtered to remove solid material therefrom and then tested in the manner already described. From a table or graph 62 previously prepared by testing various samples of soybeans containing different and known oil contents, the percent of oil in the given sample may be readily determined.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An apparatus for testing the specific gravity of liquids comprising a container, a weighted float element in said container, said float element including an upper disk of soft iron, an electrically insulative plate overlying said container, said container having an upper end, said plate having a recess therein receiving said upper end of said container, said plate having an aperture therethrough in alignment with and communicating with said recess, a coil supported on said plate, said coil having a core extending into said aperture aligning said coil with said weighted float, a source of electrical power connected to said coil, an indicator connected between said source and said coil, means for step-by-step varying the flow of electrical power between said source and said coil varying the magnetic attraction of said coil for said disk while varying the indication on said indicator, and switch means to reverse the polarity of the electrical power flowing between said source and said coil.

References Cited in the file of this patent

UNITED STATES PATENTS

| | | |
|---|---|---|
| 1,790,948 | Rodgers | Feb. 3, 1931 |
| 2,239,049 | Morris | Apr. 22, 1941 |
| 2,675,222 | Clark | Apr. 13, 1954 |

OTHER REFERENCES

Journal of the American Chemical Society, vol. 35, 1913, pp. 1666–1693.

The Review of Scientific Instruments, vol. 22, No. 8, pp. 642–646, August 1951.